United States Patent [19]
Wilson

[11] 4,089,298
[45] May 16, 1978

[54] APPARATUS FOR THE STORAGE AND TRANSPORTATION OF CRUSTACEANS

[75] Inventor: William John Wilson, Foxrock, Ireland

[73] Assignee: Trans-Homard-Lang Limited, Ireland

[21] Appl. No.: 683,673

[22] Filed: May 5, 1976

[30] Foreign Application Priority Data

May 5, 1975  Ireland ................................ 1002/75

[51] Int. Cl.² ............................................. A01K 63/00
[52] U.S. Cl. ........................................... 119/2; 119/4
[58] Field of Search ............................... 119/2, 3, 4, 5

[56] References Cited

U.S. PATENT DOCUMENTS

| | | | |
|---|---|---|---|
| 2,091,695 | 8/1937 | Thuma ...................................... | 119/5 |
| 2,302,336 | 11/1942 | Macdonald ............................... | 119/2 |
| 3,076,432 | 2/1963 | Jung et al. ................................ | 119/3 |
| 3,192,899 | 7/1965 | Lucey et al. .............................. | 119/4 |

*Primary Examiner*—Hugh R. Chamblee
*Attorney, Agent, or Firm*—Diller, Brown, Ramik & Wight

[57] ABSTRACT

A method and apparatus are provided for the live transport and storage of table fish, especially table shellfish, wherein the fish are confined in an assembly of compartments supplied with a flow of suitable water which, after its exit from the compartments, is purified, aerated and recycled to the compartments to provide a life support system. Embodiments are provided wherein each compartment is a tube, and contains a removable trough or tray, preferably subdivided by partitions to effect solitary confinement for e.g. lobsters. Specially preferred are lightweight embodiments for air transport, including the provision of disposable compartments.

2 Claims, 13 Drawing Figures

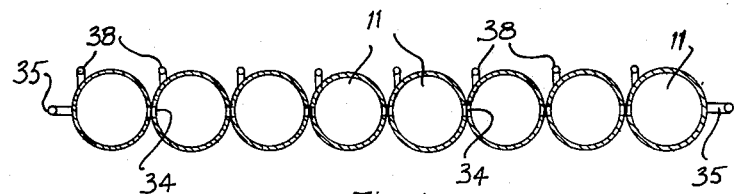
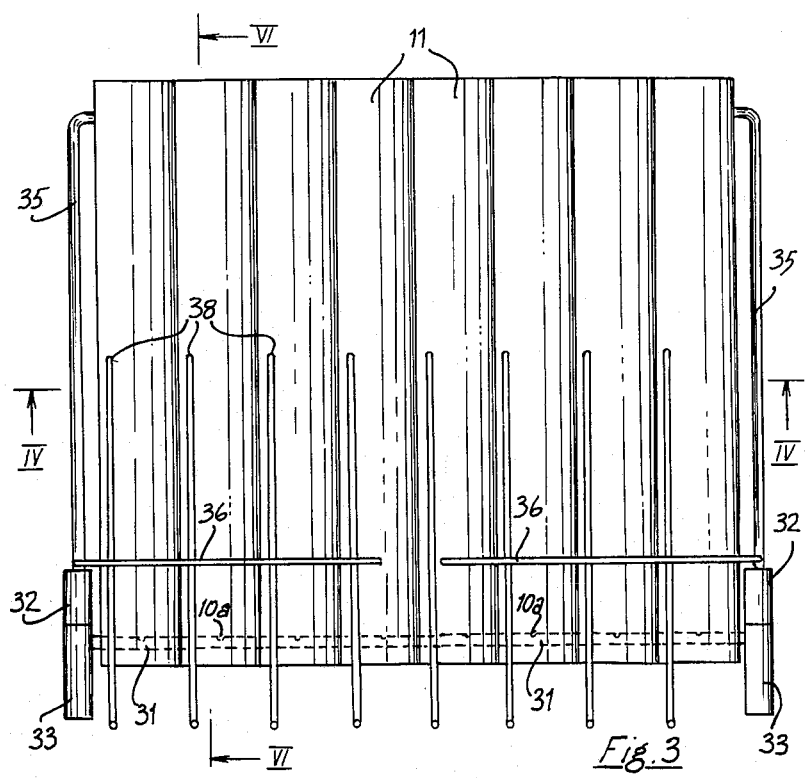
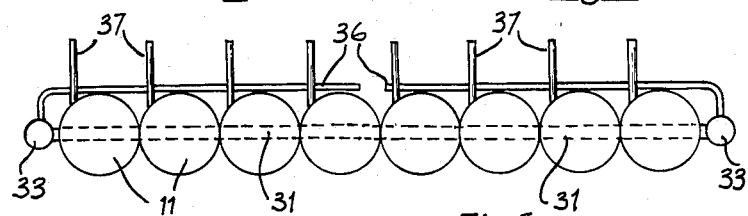

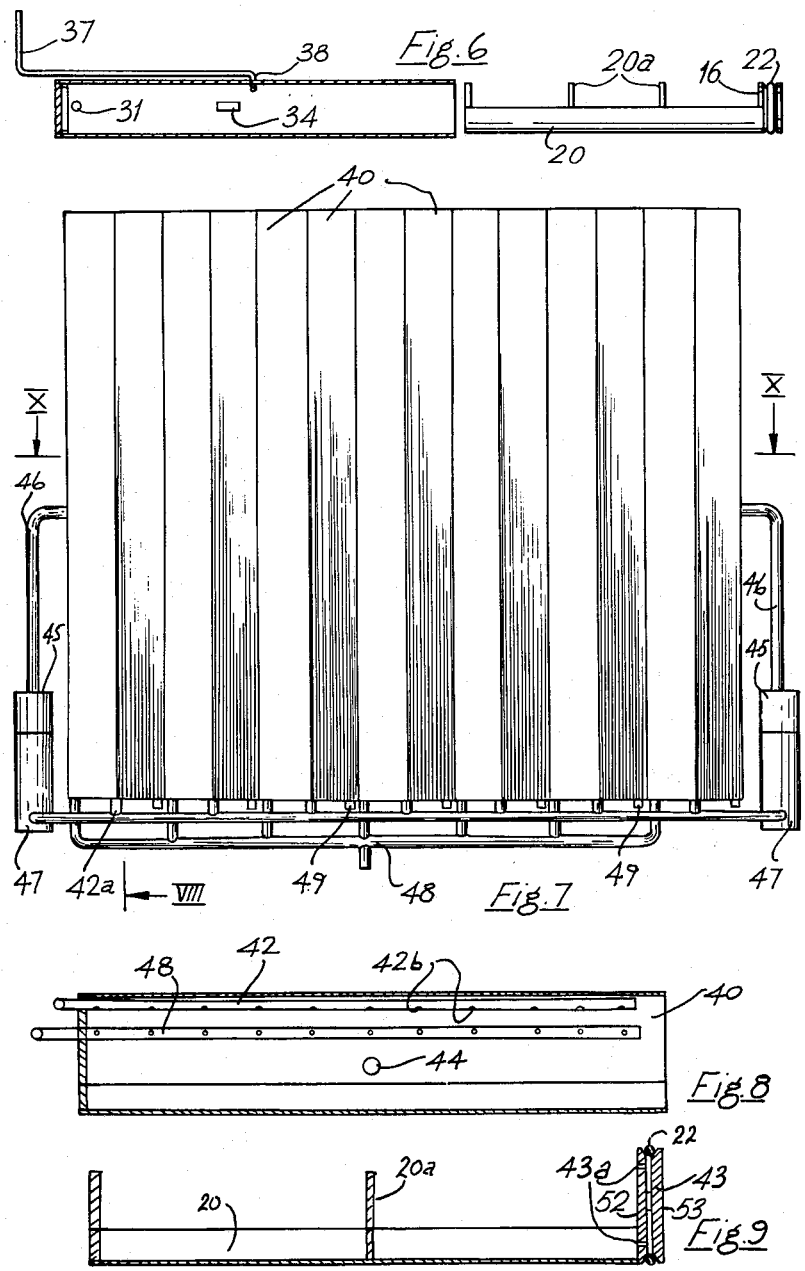

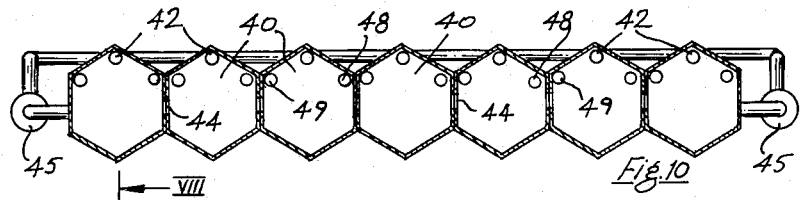
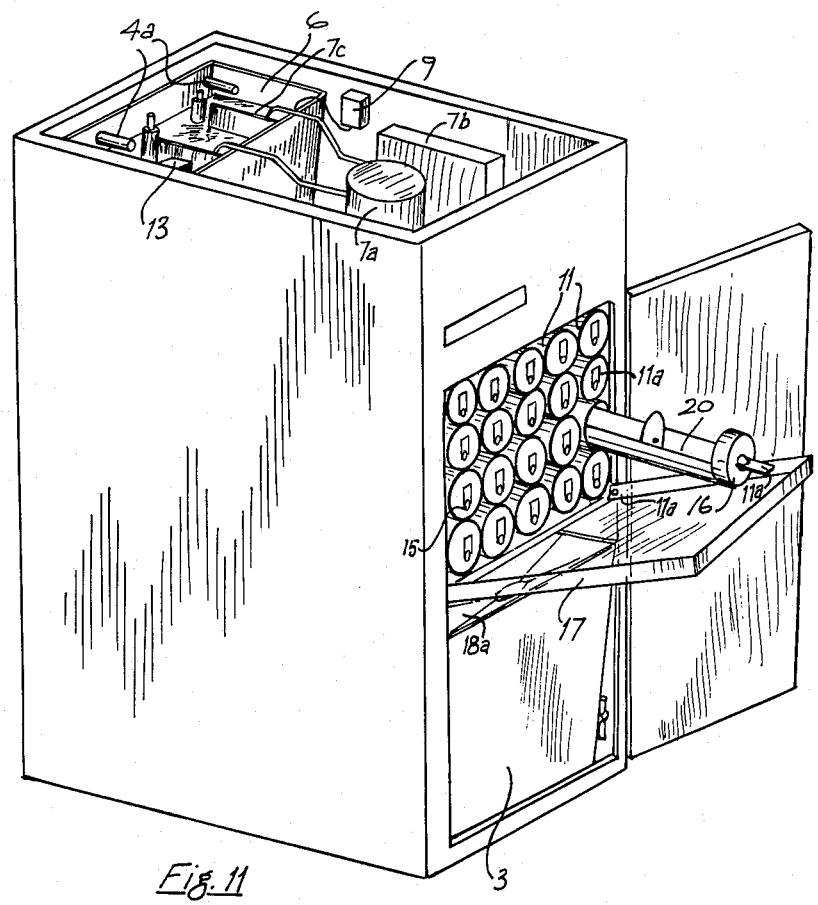

APPARATUS FOR THE STORAGE AND TRANSPORTATION OF CRUSTACEANS

The present invention relates to a method and apparatus for the live storage and transport of table fish, especially table shellfish.

The present invention is particularly directed towards the live storage and transport of lobsters, giant prawns, tails, shrimps, queens, crayfish, oysters and the like table shellfish.

There are many problems in the live transport and storage of table shellfish in that a crustacean or mollusc will normally only remain alive out of its normal environment for approximately 24 hours. Accordingly, if it is desired to store or transport live crustaceans or molluscs for longer than 24 hours it is necessary that they be provided with water while this is done. Unfortunately, various attempts to transport crustaceans and molluscs in water, particularly by air, have proved relatively expensive and inefficient. There are several serious problems. Firstly, the weight of the water greatly exceeds the weight of the shellfish being carried. This leads to heavy freight charges, especially for air transport. Secondly, it will be appreciated that one cannot pack the shellfish too tightly in a tank or the upper layers, especially where crustaceans are present, will tend to crush the lower layers. Thirdly, crustaceans in particular are often easily disturbed by travel and by the close proximity of fellow crustaceans which will lead to a high mortality rate amongst them. This high mortality rate may be from stress or indeed from the results of fighting among the crustaceans. It has in fact been found that lobsters are particularly susceptible to disturbance during transport.

Ideally live crustaceans and particularly the larger crustaceans such as lobsters should be transported separately from their fellows so that they cannot interfere with each other. It is preferable that a constant flow of suitable water be provided. It has also been found that it is desirable to transport and store shellfish in a relatively light free environment.

The present invention is directed towards providing a method and apparatus for the live storage and transport of table fish, especially table shellfish, which will overcome some or all of the above recited disadvantages and problems.

According to the invention there is provided a method for the live storage and transport of table fish, especially table shellfish, which comprises confining the table fish in a unitary assembly of discrete compartments, delivering water to each compartment in a substantially constant flow, and removing excess water from the compartments.

The substantially constant flow may be continuous or intermittent. Its magnitude is preferably selected to harmonize with the needs of the table fish. The excess water, after removal from the compartments, is preferably recycled. If this is done, the excess water is also preferably purified and aerated before redelivery to the compartments. Purification preferably comprises filtration and contact with an inert adsorbent material such as activated charcoal or kieselguhr. Removal of excess water is preferably effected by simple drainage or by overflow from a water level selected with reference to the size and needs of the table fish. Recycling is effected for preference by pumping. The table fish are kept in darkness or semi-darkness for preference during the performance of the method. In the case of large crustaceans, it is preferable to confine each animal in an individual compartment.

The invention also provides apparatus for the live storage and transport of table fish, especially table shellfish, which comprises a unitary assembly of discrete compartments adapted for the confinement of the table fish, means for delivering water automatically into each compartment, and means for removing excess water therefrom.

Each compartment may comprise a trough, but it is preferred that troughs be provided each of which is subdivided along its length, and that each compartment comprises one such subdivision. For purposes of transport, especially air transport, it is preferred that the compartments be constructed of lightweight material. In a specially preferred embodiment, compartments of lightweight disposable (and hence non-returnable) plastics material are provided. Thus the returnable equipment may be limited to the water delivery and removal means.

It is also preferred that the water delivery and removal means be interconnected and thus comprise water recycling means. Said water recycling means, when present, includes for preference water purification and aeration means, and at least one pump. The water purification means may include a water filter and equipment for contacting the filtered water with an inert adsorbent material such as activated charcoal or kieselguhr. It is desirable to maintain the temperature of the circulating water at a value suitable for the needs of the shellfish, expecially for their respiratory needs. For this purpose refrigeration equipment may be incorporated in the apparatus.

In one embodiment of the invention an apparatus for the live storage and transport of large crustaceans comprises: a plurality of tubular containers; a withdrawable tray within each tubular container; divider members within each tray, dividing the tray into a number of storage compartments each for one crustacean; a water storage tank; an inlet pipe at one end of each tubular container, connected to the water storage tank; and an outlet pipe at the other end of each tubular container, connected to the water storage tank. Preferably the tubular containers in this embodiment are arranged in a number of rows and columns within a peripheral framework or support so that in use the tubular containers are substantially horizontal. Needless to say, pumps are provided to deliver the water from the water storage tank to the tubular containers and the trays therein. It is also preferable to have aeration and purification equipment for the water.

The invention will be understood in greater detail from the following description of some embodiments thereof given by way of example only with reference to the accompanying drawings in which:

FIG. 1 is a sectional side elevation of an apparatus for the live storage and surface transport of lobsters, crayfish and the like;

FIG. 3 is a plan view of a single layer of tubular lobster containers and ancillary devices, taken from an apparatus similar to that of FIGS. 1 and 2;

FIG. 4 is a cross section taken along the line IV — IV in FIG. 3 and viewed in the direction of the associated arrows;

FIG. 5 is a lower end elevation of the layer of containers of FIG. 3;

FIG. 6 is a sectional side elevation of one of the containers of FIG. 3, together with a simple side elevation of a tray removed therefrom;

FIG. 7 is a plan view of a single layer of tubular lobster containers and ancillary devices, taken from an apparatus for the live storage and air transport of lobsters, crayfish and the like;

FIG. 8 is a sectional side elevation of one of the containers of FIG. 7, taken along the line VIII — VIII in that figure and viewed in the direction of the associated arrows;

FIG. 9 is a sectional side elevation of a tray removed from the container of FIG. 8;

FIG. 10 is a cross-section taken along the line X — X in FIG. 8 and viewed in the direction of the associated arrows;

FIG. 11 is an isometric view of a complete apparatus similar to that of FIGS. 1 and 2;

Figure 1:
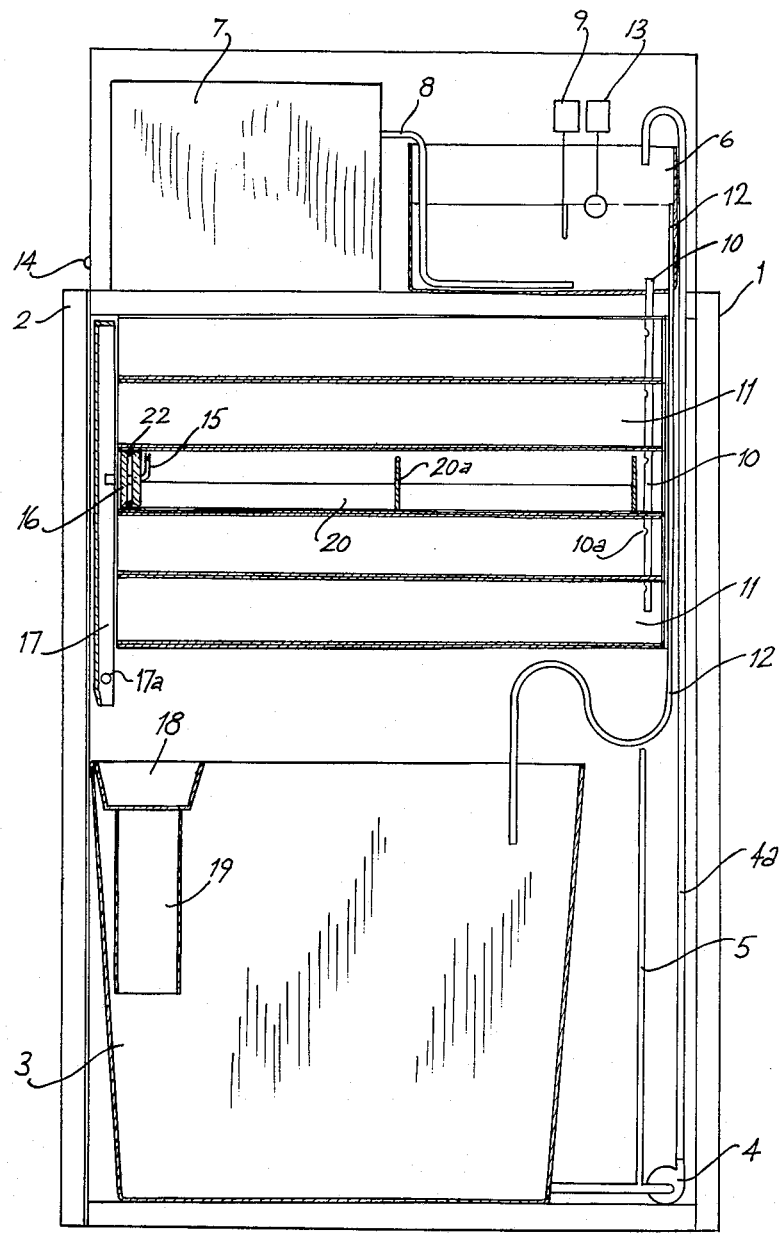
Figure 2:
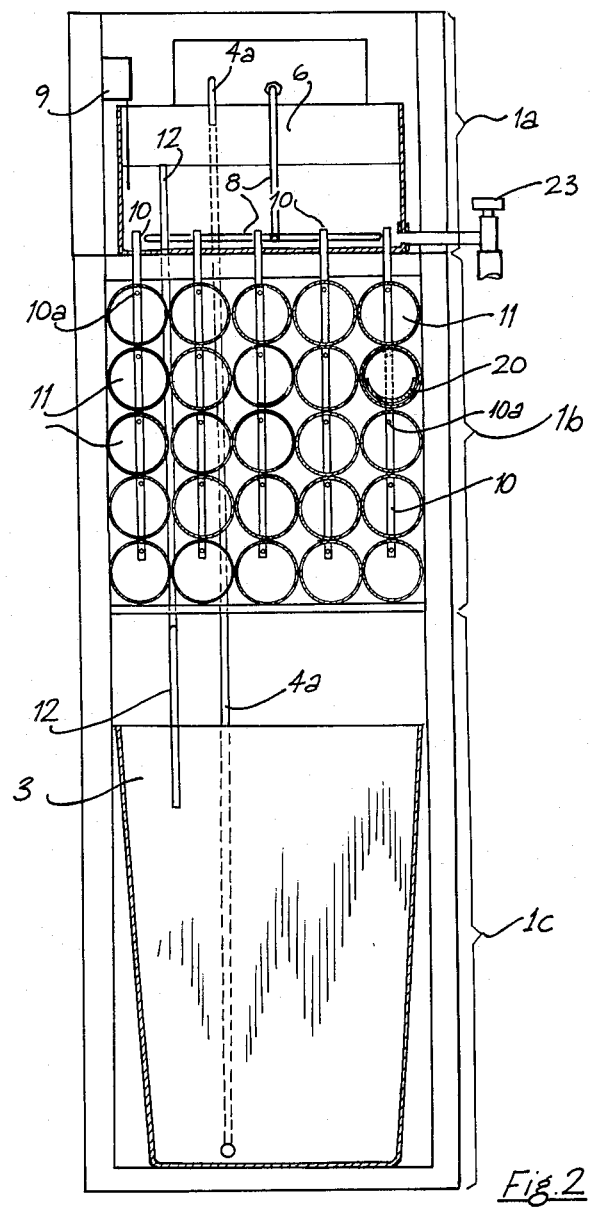
FIG. 2 is a sectional front elevation of the apparatus of FIG. 1.
Figure 12:
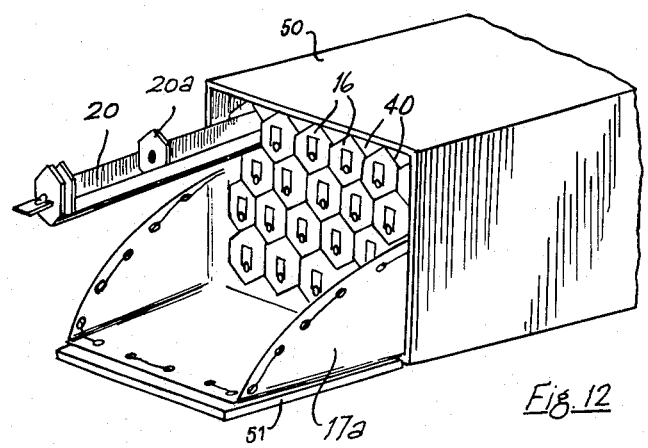
FIG. 12 is an isometric view of an apparatus comprising layers of containers similar to those of FIGS. 7 and 10.
Figure 13:
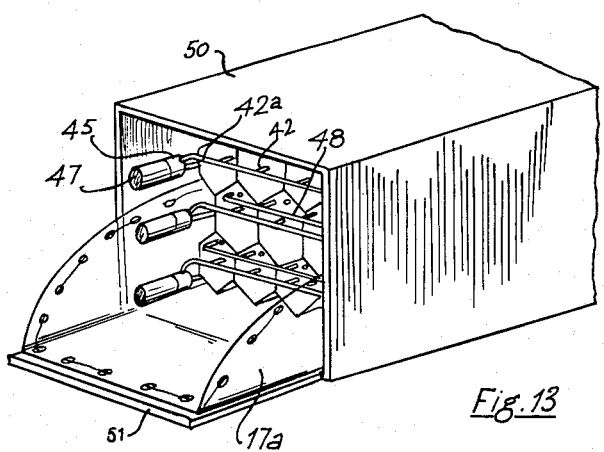
FIG. 13 is an isometric view of the apparatus of FIG. 12, taken from the other end (the end not shown in FIG. 12.)

Referring now to the drawings, and in particular to FIGS. 1, 2 and 11, apparatus for the live storage, rather than transport, of lobsters, crayfish, oysters and the like comprises a thermally insulated cabinet 1 divided into three sections 1a, 1b, 1c, the lower two of which 1b, 1c are accessible by means of a door 2. The lowest section 1c contains a sump tank 3. The top section 1a contains a header tank 6 and a refrigeration unit 7. A water supply pipe 4a and an in-line water pump 4 provide a water supply connection from the sump tank 3 into the header tank 6. An air inlet pipe 5 communicates with the pump inlet where the reduced pressure in operation causes air from atmosphere to enter the air inlet pipe 5 and mix with the water in the supply pipe 4a.

A float switch 13 monitors the water level in the header tank 6, governs the operation of the pump 4 to maintain said water level, and operates an alarm device 14 in the event of any substantial variations in said water level indicating a malfunction. An overflow pipe 12 directs surplus water from the feed tank 6 back into the sump tank 3.

The refrigeration unit 7 includes a cooling coil 8 and is governed by a thermostat 9; it serves to maintain the temperature of the water in the header tank 6 within desired limits. The refrigeration unit 7 and the pump 4 are powered from a source external to the apparatus, e.g. mains electricity or a vehicle's electrical supply.

The mid-section 1b of the cabinet 1 contains a stack of layers of tubular containers 11 each closed at one end, and each containing a removable trough 20 subdivided by partitions 20a into individual lobster compartments. Each trough 20 terminates at one end in an adjustable sealing plug 16 adapted, when the trough is positioned in a tubular container 11, to close the open end of said container in watertight fashion. Each sealing plug 16 comprises two opposed discs defining between them an annular space of tapered radial section, and a resilient sealing ring 22 which occupies said annular space. The discs are in screw-engagement with one another and can thus be approximated so as to expand the diameter of the sealing ring 22 to seal the open end of the tubular container 11.

The containers 11 are arranged in vertical as well as horizontal rows in the stack. A number of feed pipes 10 equal to the number of vertical rows is provided. Each feed pipe 10 passes through the containers 11 of a vertical row establishing a water delivery connection from the header tank 6 to each container 11 by means of perforations 10a or otherwise. The perforations 10a or the like are graduated in size to ensure a constant controlled delivery of water to each container 11, despite the differences in head of water.

An overflow pipe 15 mounted in the sealing plug 16 of each tubular container 11 governs the water level in the container, and delivers surplus water into the sump tank 3 for recycling. A filter 18 and purifier 19 are arranged to intercept the water draining from the overflow pipes 15, and to filter and purify said water before discharging it into the sump tank 3. A transparent plastics cover 17 permits observation of the operation of all the overflow pipes 15 when the door 2 is opened. The cover 17 is pivoted at 17a and can be swung into a horizontal position when required, allowing access to the containers 11 for loading and unloading the same. When occupying its horizontal position the cover 17 becomes a drip tray and continues to direct the overflow water into the filter 18 avoiding water loss. A drain cock 23 permits drainage of the entire apparatus after use, the contents of the sump tank 3 being first pumped into the header tank 6.

The embodiment of the invention shown in FIG. 11 differs slightly from that of FIGS. 1 and 2. Two pumps are used, hence there are two water supply pipes 4a. Instead of a refrigeration unit 7 there are shown a compressor 7a, a condenser 7b and evaporator or cooling plates 7c which serve instead of the cooling coil 8. The tubular containers 11 are shown with foldback handles 11a for ease of withdrawal. A water collecting tray or funnel 18a is provided to feed the filter 18.

FIGS. 3 to 6 illustrate an embodiment of the invention which differs from that of FIGS. 1 and 2 in having no sump or header tank, and in that each layer of tubular containers 11 is a self-contained recycling unit, having a pair of small pumps 33 and filter units 32 receiving water from drain pipes 35 and air from inlet pipes 36 and feeding an air/water mixture to the containers 11 from a horizontally disposed feed pipe 31 which passes through all the containers 11. Water feed, as before, is through perforations 10a in the feed pipe 31. The containers 11 drain one into another, each being welded or otherwise bonded to its neighbour around an overflow opening 34. All the openings 34 are at the same level, which is accordingly the water level within the containers 11. Exhaust pipes 38 are provided, one for each container 11, through which excess air escapes. Each exhaust pipe 38 is turned upwardly at its end 37 to avoid water spillage. The pipes 38 are disposed along and between the containers 11 so as not to obstruct the next layer of containers 11 immediately above. This embodiment is lighter and less bulky than that of FIGS. 1, 2 and 11 and accordingly is suitable for the transport, as well as the storage, of lobsters, crayfish, oysters and the like.

FIGS. 7 - 10, 12 and 13 illustrate an embodiment of the invention very similar to that of FIGS. 3 to 6, but of ultra-light weight and specially adapted for the live air transport of lobsters, crayfish, oysters and the like. The tubular containers, here labelled 40, are hexagonal in cross-section and constructed of thin-walled plastics material. Their hexagonal form enables superjacent layers to nest in one another, with no dead space, as can be seen from FIGS. 12 and 13. The drainage system with welded holes or ostomies 44 and drain pipes 46, is similar to that of the FIGS. 3 – 6 embodiment, each layer having two small pumps 47 and filter and purification units 45. The water feed to the containers 40, however, is through a manifold 42a from which an arm 42 runs the length of each container 40 within the same and at the apex thereof. Each arm 42 has minute perforations 42b along its length whereby the contained animals are subjected to a fine shower or spray of water. A second manifold 48 supplies fresh air under pressure from similar perforations, from an outside source (not shown). The falling spray or shower of water is thus reoxygenated. Short bleed pipes 49 allow surplus air to escape. A casing 50 surrounds the whole assembly of layers of containers 40. A door 51 is provided at either end of the casing and a flexible plastics membrane 17a guards against spillage and splashing.

Each trough 20 is provided with a hexagonal plug 43 generally similar to the sealing plugs 16 previously described. The plug 43 comprises two flat plug members 52, 53 adapted to be approximated to expand and engage a flexible sealing ring 22 when the trough 20 has been positioned within a container 40. The inner plug member 52 is provided with two perforations 43a, an upper and a lower, whereby the water within the container 40 and trough 20 finds its level between the plug members. The outer plug member 53 is of transparent material, whereby the said water level can be observed at will.

In use, in all embodiments, the lobsters, crayfish or the like are loaded into the compartments of the troughs 20 which are then inserted in the tubular containers 11, 40 so as to seal the container mouths. Suitable water, fresh or salt according to the origin of the shellfish, is then introduced and recycled automatically during storage or transport of the shellfish. The apparatus of the invention thus provides a self-contained life support system for the shellfish for as long as may be required.

Apparatus according to the present invention is particularly suitable for packaged delivery. For example, the apparatus may be loaded aboard a trawler or on the dockside and the shellfish need not be removed until required for use in a restaurant, hotel or retail establishment.

It will be appreciated that the apparatus may be made from mild steel, coated with a suitable non-toxic material, glass, glassfibre, P.V.C., or the like material.

While the apparatus described above comprises a number of tubular containers the apparatus may alternatively comprise a number of substantially open-work shellfish containers, for example it may be manufactured from a P.V.C. perforated plate or the like mesh. In such an apparatus it is preferable that water be sprayed through the containers and not delivered into individual containers.

It will be appreciated that further apparatus for accurately controlling the environment of the shellfish may be provided. For example, in addition to oxygenation and purification equipment, heating equipment may be provided. Further it will be appreciated that controlled quantities of nutrient or prophylactic substances may also be provided with the water.

What is claimed is:

1. Apparatus for the live storage and transport of table fish, especially table shellfish, said apparatus comprising an assembly of tubular containers joined together in side-by-side relation for positioning within a housing in layers, a fish-supporting trough separately withdrawably housed in each tubular container in closing relation, each container and its respective trough defining a discrete compartment, and means coupled to each compartment for delivering water into and removing water from each compartment, wherein each tubular container has at least one open end, and the respective trough has a plug closing said container open end, said plug including two plug members accommodating a sealing member therebetween, and said plug members being operable to expand said sealing member outwardly into contact with an interior wall of the open end of the respective tubular container.

2. Apparatus for the live storage and transport of table fish, especially table shellfish, said apparatus comprising an assembly of tubular containers joined together in side-by-side relation for positioning within a housing in layers, a fish-supporting trough separately withdrawably housed in each tubular container in closing relation, each container and its respective trough defining a discrete compartment, and means coupled to each compartment for delivering water into and removing water from each compartment, wherein each tubular container has at least one open end, and the respective trough has a plug closing said container open end, said plug including inner and outer plug members, and said outer plug member being transparent and accessible to water in the respective compartment whereby the water level in the compartment can be observed.

* * * * *